3,506,614
PREPARATION OF OXYMETHYLENE AND METHYLENE SULFIDE POLYMERS

Catherine S. H. Chen, Berkeley Heights, and Anthony Baylis, Union, N.J., assignors to Celanese Corporation, New York, N.Y., a corporation of Delaware
No Drawing. Filed Jan. 8, 1968, Ser. No. 696,130
Int. Cl. C08g 1/20, 1/14, 23/00
U.S. Cl. 260—67                               14 Claims

ABSTRACT OF THE DISCLOSURE

A method for producing oxymethylene and methylene sulfide polymers by polymerizing a source of recurring oxymethylene moieties, or a source of recurring methylene sulfide moieties, in the presence of a catalytic amount of a novel transition metal catalyst. The novel catalysts are the hydrates of the halides of metal of the 2nd and 3rd transition series of Group VIIIb of the Periodic Table of the Elements.

---

This invention relates to the catalytic polymerization of polymers characterized by recurring —$CH_2X$— units, wherein X is oxygen or sulfur. More particularly it relates to their preparation by the use of novel transition metal catalysts. Oxymethylene polymers having recurring —$CH_2O$— units have been known for many years. They may be prepared for example, by the polymerization of anhydrous formaldehyde or by the polymerization of trioxane, which is a cyclic trimer of formaldehyde, and will vary in physical properties such as thermal stability, molecular weight, molding characteristics, color and the like depending, in part, upon their method of preparation, and especially on the catalytic polymerization technique employed.

Methylene sulfide polymers, the sulfur analog of oxymethylene polymers, somewhat less known to the art, are characterized by recurring —$CH_2S$— units. They may be prepared for example, by the polymerization of trithiane, the cyclic trimer of thioformaldehyde.

High molecular weight oxymethylene polymers have been prepared by polymerizing trioxane in the presence of certain fluorine-containing catalysts. For example, they may be prepared in high yields and at rapid reaction rates by the use of catalysts comprising boron fluoride coordination complexes with organic compounds as described in U.S. Patent No. 2,989,506 to Donald E. Hudgin and Frank M. Berardinelli. Other catalysts that have been suggested for use in polymerizing trioxane or formaldehyde alone or with other copolymerizable components to produce oxymethylene polymers are thionyl chloride, fluorosulfonic acid, methanesulfonic acid, phosphorus trichloride, titanium, tetrachloride, ferric chloride, zirconium tetrachloride, aluminum trichloride, stannous chloride and stannic chloride. However the preferred catalysts heretofore employed have been boron trifluoride and the boron fluoride complexes with water and the previously mentioned boron fluoride coordinate complexes with organic compounds, particularly those in which oxygen or sulfur is the donor atom.

These Lewis acid catalysts, and preferably boron trifluoride, have also been used to polymerize trithiane to methylene sulfide polymers. The mechanism is believed to be cationic in nature and similar to that of trioxane polymerization. Dimethyl sulfate has also been used for bulk polymerizations of trithiane, however, this and the $BF_3$ catalysts were found not to cause polymer formation in trithiane solutions.

The above-mentioned polymerization catalysts are of the strong Lewis acid type and are therefore sensitive to the presence of bases, such as water and alcohols. For example, when boron trifluoride or boron trifluoride etherate is placed in water, or even in the presence of water vapor, the boron compound hydrolyzes explosively and forms boron hydroxide. This latter product of the hydrolysis is not a catalyst for the polymerization. If water is present in the reaction zone in amounts over 0.1 percent, there is no polymerization. Also, if water is present in lesser quantities in the reaction zone, the polymerizataion reaction is susceptible to the chain transfer mechanism which tends to limit molecular weight.

Accordingly, it is an object of the present invention to provide a novel group of catalysts which will yield high molecular weight oxymethylene polymers and copolymers. It is another object of the present invention to provide a novel group of catalysts which will yield high molecular weight methylene sulfide polymers. It is another object of the present invention to provide a novel group of catalysts that will be less sensitive than the prior art catalysts to the presence of impurities, such as water and alcohol, inherently present in the commercial grades of monomers, e.g. cyclic formals, such as trioxane, dioxolane, and the like. It is yet another object of the present invention to provide a novel group of catalysts which will yield high molecular weight oxymethylene polymers and copolymers of higher melting points than are obtainable with the above-mentioned cationic polymerization catalysts of the prior art.

These and other objects of the present invention as well as the means of effectuating them, will be discussed in detail hereinbelow.

The present invention is based on our discovery that the hydrates of the halides of metals of the 2nd and 3rd transition series of Group VIIIb of the Periodic Table of the Elements, (Handbook of Chemistry and Physics, Student 44th Edition, (1963), pp. 448–449), are effective catalysts for the polymerization of oxymethylene and methylene sulfide forming monomers. More particularly, these catalysts are hydrates of a compound represented by the general formula:

$$M(Z)_n$$

wherein M represents a metal selected from the group consisting of ruthenium, rhodium, palladium, osmium, iridium, and platinum, Z is a halogen, preferably chlorine or bromine and n is a whole number of from 2 to 4, inclusive, which corresponds to the valence of M.

An illustrative but by no means exhaustive listing of such hydrates includes: ruthenium trichloride trihydrate, ruthenium tribromide trihydrate, rhodium trichloride trihydrate, rhodium tribromide trihydrate, palladium dichloride dihydrate, palladium dibromide dihydrate, osmium trichloride trihydrate, osmium tribromide trihydrate, iridium trichloride trihydrate, iridium tribromide trihydrate.

As these novel catalysts are not as strong Lewis acids as are the fluoride containing catalysts of the prior art, they are relatively insensitive to bases, such as water and alcohols. This lower sensitivity is of great commercial significance in that the monomers polymerized therewith, and particularly trioxane, can be of lower purity than is generally required when the catalyst is of the strong Lewis acid type e.g. boron trifluoride or its complexes.

The oxymethylene polymers that may be prepared with our novel transition metal catalysts include both oxymethylene homopolymers and copolymers.

Oxymethylene homopolymers are prepared by the polymerization of a sole monomer, e.g., trioxane or formaldehyde, which yields the recurring (—$CH_2O$—) units. A pure oxymethylene homopolymer of high molecular weight has a good degree of thermal stability but is rendered more stable when the hemiacetal end groups are end-capped. This end-capping is done to prevent depolymerization of the polymer chain and is accomplished by reacting the homopolymeric oxymethylene glycols with carboxylic acid anhydrides, alcohols, alphachloroalkyl ethers, expoxides, isocyanate ethers, acrolein, acrylonitrile and styrene.

Oxymethylene copolymers obtained using our novel catalysts are ones in which there are carbon-to-carbon single bonds in the main polymer chain. These copolymers are prepared by polymerizing a source of the oxymethylene moiety, e.g., trioxane, together with a cyclic formal having at least two adjacent carbon atoms, such as 1,3-dioxolane, 1,3-dioxane, and the like.

In a preferred embodiment of the present invention the oxymethylene copolymer produced has at least one chain containing recurring oxymethylene ($-OCH_2-$) units interspersed with ($-OR-$) groups in the main polymer chain where R is a divalent radical containing at least two carbon atoms directly linked to each other and positioned in the chain between the two valences, with any substituents on said R radical being inert, that is those which will not induce undesirable reactions. Particularly preferred are copolymers which contain from 60 to 99.6 mol percent of recurring oxymethylene groups. In another embodiment R may be, for example, an alkylene or substituted alkylene group containing at least two carbon atoms.

The term "oxymethylene" as used in the specification and claims of this application, unless it is clear from the context that a more specific meaning is intended, includes substituted oxymethylene, wherein the substituents are inert with respect to the reactions in question; that is, the substituents are free from any interfering functional group or groups that would cause or result in the occurrence of undesirable reactions.

The amount of the transition metal polymerization catalyst employed can be varied within wide limits. Generally, a catalytic amount of the catalyst will correspond to a molar ratio of catalyst to monomer of from about 1:100 to about 1:1,000,000 respectively. Preferably, however, the molar ratio of catalyst to monomer in the polymerization zone is from about 1:1,000 to about 1:100,000, respectively.

The monomer or plurality of monomers charged to the reaction zone will preferably be substantially anhydrous i.e., at as low a moisture content as can be practically achieved. However, small amounts of moisture, such as may be present in a commercial grade of reactant material or introduced by contact with atmospheric air will not prevent polymerization. It is suggested that this moisture be removed for optimum results, but this removal is no longer critical as it was with the previously employed strong Lewis acid catalysts. With our novel transition metal catalysts, polymerization will still occur if water is present in the polymerization zone from about 1 percent to about 5 percent, based on the weight of the monomer. The polymerization conditions employed when using our novel catalysts can also vary within wide limits depending primarily upon the makeup of the monomer feed and the type of polymerization system employed. In one specific technique for effecting polymerization (homopolymerization or copolymerization) a source of recurring oxymethylene moieties, e.g. trioxane or other formaldehyde - engendering compound, alone or with another monomer e.g. a cyclic formal such as 1,3-dioxolane, with or without a chain branching agent, are blended with the catalyst in a solvent for the monomers such as cyclohexane or benzene. The polymerization is then permitted to proceed in the sealed reaction zone. The temperature in the reaction zone may vary from, for example, about 40° C. to about 120° C. Preferably, the reaction solution is maintained at about 100° C. for the period of from about 5 minutes to about 72 hours. The polymerization reaction may be effected under pressures ranging from subatmospheric to 100 atmospheres or more.

Various other solvents besides those just mentioned can be used for the solution polymerization of trioxane, among which are alkyl derivatives of cyclohexane, e.g. substituted derivatives of benzene, preferably those in which the substituents are electron withdrawing substituents, and especially electron withdrawing substituents, such as the halogens e.g., the chlorobenzenes, chlorinated aliphatic hydrocarbons, e.g., methylene dichloride, saturated and unsaturated aliphatic esters such as ethylacetate and methylacrylate which are solvents for the catalyst also. Straight chain aliphatic hydrocarbons are preferred for the heterogeneous suspension systems. When the heterogeneous suspension polymerization is the type employed, crystalline trioxane in a liquid medium, the temperature should be maintained at from about 10° C. and 60° C. and preferably at from about 40° C. to about 60° C.

Polymerization may also be carried out in bulk when the source of the recurring oxymethylene moieties is trioxane. In such a case the temperature in the reaction zone may vary from about 65° C. to about 120° C., with the preferred range being from 65° C. to about 100° C.

If formaldehyde is the source of the recurring oxymethylene moieties, the temperature in the reaction zone may vary from about $-120°$ C. to about 120° C., with the particular temperature chosen depending for the most part upon the state of the formaldehyde employed. Generally an inert atmosphere is desirable when polymerizing formaldehyde. If the polymerization is to be carried out under pressure, the temperature of the reaction zone may be proportionately lowered.

When trithiane is the methylene sulfide forming monomer, the polymerization may also be carried out either in bulk, solution or heterogeneous form. In bulk, the temperature in the polymerization zone may vary from about 217° C. to about 250° C., with the preferred temperature about 220° C. The solution and suspension types of polymerization should be carried out from about 100° C. to about 200° C. Suitable solvents include chlorobenzene, biphenyl, phthalic anhydride, cyclohexane and nitrobenzene.

There is no critical mixing sequence when practicing the instant invention. The novel transition metal catalysts may be added to the polymerization zone either simultaneously or after the monomers are mixed in the zone. However it is preferred that the catalysts be added to the monomers after the monomers are mixed therein, whether the polymerization is carried out in bulk, solvent, or heterogeneous system.

After the polymerization reaction is complete excess monomer present in the polymerization zone can be removed by solvent extraction. Thus, for example, when trioxane is polymerized in cyclohexane the resulting oxymethylene polymer can be washed in a water-acetone mixture before drying. When trithiane is polymerized in for example, biphenyl, the resulting methylene sulfide polymer is treated with hot N-methyl-2, pyrrolidone.

In order that those skilled in the art may better understand how the present invention can be carried into effect, the following examples are given by way of illustration and not by way of limitation. All parts and percentages are by weight unless otherwise stated.

EXAMPLE I

This example illustrates the solution polymerization of trioxane in cyclohexane using rhodium trichloride trihydrate ($RhCl_3 \cdot 3H_2O$) as the polymerization catalyst.

The polymerization was carried out in a polymerization tube containing 39.4 parts of trioxane and 20 parts of cyclohexane. To this mixture there was added 0.3 part of rhodium trichloride trihydrate, following which the tube was flushed with dry argon for five minutes and then immediately capped. The tube was then heated at 100° C. for 16 hours. A white polymer precipitated from the yellow supernatant solution and then was allowed to cool. The thus-obtained polymer was collected by filtration, washed with a water-acetone mixture and dried, giving 38 parts of polymer, which corresponds to a yield of 97 percent. The polymer has a melting point of 188° C. and an inherent viscosity (I.V.) value of 0.36–0.38. The inherent viscosity in this example and the following examples was measured at 60° C. in 0.1 weight percent solution in p-chlorophenol containing 2 weight percent of alpha-pinene.

EXAMPLE II

A bulk polymerization of trioxane was carried out by heating 45 parts of trioxane to melt in an open test tube then adding 0.05 part of rhodium trichloride trihydrate to the melt. Instantaneous polymerization resulted, changing the trioxane into a solid polymer mass.

EXAMPLE III

The procedure of Example II was repeated using 0.05 part of iridium trichloride trihydrate as the catalyst. Again instantaneous polymerization resulted.

EXAMPLE IV

This example illustrates the fact that while the hydrates of the transition metal chlorides are effective polymerization catalysts, the corresponding anhydrous compounds are not.

A polymerization tube was charged with 40 parts of trioxane and 20 parts of cyclohexane. 0.1 part of anhydrous rhodium trichloride was then added, following which the tube was immediately capped and flushed with dry argon for five minutes. No polymerization took place after 16 hours at 100° C.

To this anhydrous mixture there was then added 0.005 part of water by injection through the cap. Polymerization took place immediately. The precipitated polymer was collected by filtration, washed with a water-acetone mixture and dried. The polymer has a melting point of 184–185° C. and an I.V. value of 0.50.

This example also illustrates the fact that the catalyst the hydrate of the transition metal halide, can be formed in situ in the polymerization zone. Thus, if the contents of the polymerization zone are completely anhydrous and an anhydrous transition metal halide is added as a catalyst there will be no polymerization. When water is added, the polymerization reaction proceeds. If the contents of the polymerization zone are not completely anhydrous, the polymerization reaction will proceed upon the addition of anhydrous transition metal halide as the hydrate will form with the water present and initiate the polymerization reaction.

EXAMPLE V

The procedure of Example I was followed using the following reactants:

| | Parts |
|---|---|
| Trioxane | 45.5 |
| Cyclohexane | 20.0 |
| Ruthenium trichloride trihydrate | 0.28 |

The resultant polymer has a melting point of 183° C. and an I.V. value of 0.58.

EXAMPLE VI

The procedure of Example I was followed using the following reactants:

| | Parts |
|---|---|
| Trioxane | 45.9 |
| Cyclohexane | 20 |
| Rhodium trichloride trihydrate | 0.024 |

Polymerization was carried out at 100° C. to give a solid white oxymethylene homopolymer.

EXAMPLE VII

The procedure of Example I was followed using the following reactants:

| | Parts |
|---|---|
| Trioxane | 45 |
| Benzene | 25 |
| Iridium trichloride trihydrate | 0.015 |

Polymerization took place at 30° C., giving a solid white oxymethylene homopolymer.

The following examples illustrate the copolymerization of trioxane and a cyclic formal using the novel catalysts of the present invention.

EXAMPLE VIII

The procedure of Example I was followed using the following reactants:

47.0 parts trioxane
2.0 ml. 1,3-dioxolane
25 ml. cyclohexane
0.05 grams iridium trichloride trihydrate Polymerization was carried out at 100° C. for 30 minutes. After washing the copolymer with a water-acetone mixture and drying it, 23.3 grams of copolymer remained. The copolymer has an I.V. value of 1.22–1.23.

EXAMPLE IX

The procedure of Example I was followed using the same reactants as in Example VIII except that 2.0 parts of 1,3-dioxane were used in place of the 1,3-dioxolane. A solid copolymer resulted which was washed in a water-acetone mixture and dried.

EXAMPLE X

The procedure of Example I was followed using the same reactants as in Example VIII except that 2.0 parts of 4-methyl m-dioxane were used in place of the 1,3-dioxolane. A solid copolymer resulted which was washed in a water-acetone mixture and dried.

EXAMPLE XI

The procedure of Example I was followed using the following reactants:

52.8 grams trioxane
2.0 ml. 1,3-dioxolane
25 ml. cyclohexane
0.05 grams rhodium trichloride trihydrate Polymerization was carried out at 100° C. for 16 hours. The precipated copolymer was washed and dried and 33.4 grams remained. The copolymer has an I.V. value of 1.11–1.12.

EXAMPLE XII

A catalyst solution of 0.1 parts of iridium trichloride trihydrate in 100 parts of ethylacetate was prepared. Five ml. of this catalyst solution was added to a molten mixture of 103 parts of trioxane and 5 parts of 1,3-dioxolane in a polymerization tube maintained at 65° C.

A white solid copolymer forms rapidly and polymerization is complete after five minutes. After washing and drying the copolymer, 97.2 parts remained or a yield of 90 percent. The I.V. value of the copolymer was 1.81.

The following examples illustrate the fact that oxymethylene polymers polymerized with our novel transition metal catalysts are of a higher melting point than the identical polymer polymerized with strong Lewis acid catalysts of the type preferred in the prior art.

EXAMPLE XIII

A mixture of 103 grams of trioxane and 3.5 grams of 1,3-dioxolane was placed in a reaction tube and heated to 65° C. The monomer mixture melted and the temperature in the tube was maintained at 65° C. Then 0.01 gram of boron fluoride-dibutyl etherate ($BF_3 \cdot Bu_2O$) was added to the molten monomer mixture.

The molten monomer mixture turned into a solid white copolymer within 5 minutes after the addition of the catalyst. The thus-obtained copolymer was collected, washed with a water-acetone mixture and dried, giving 95.9 grams of copolymer, which corresponds to a yield of 90 percent. The copolymer has an I.V. value of 1.3 and a melting point of 164° C.

EXAMPLE XIV

The procedure of Example XI was repeated using FeCl$_3$ as the polymerization catalyst. The resultant copolymer had a melting point of 164° C.

EXAMPLE XV

The procedure of Example XI was repeated using the following reactants:

|  | Grams |
|---|---|
| Trioxane | 103 |
| 1,3-dioxolane | 3.5 |
| Rhodium trichloride trihydrate | 0.05 |

The molten monomer mixture turned into a solid white copolymer within 15 minutes after addition of the catalyst. The thus-obtained copolymer was collected, washed with a water-acetone mixture and dried, giving 95.9 grams of copolymer, or a yield of 90 percent. The copolymer has an I.V. value of 1.5 and a melting point of 180° C.

The following examples illustrate the polymerization of trithiane using our novel transition metal catalysts.

EXAMPLE XVI

The polymerization tube was charged with 50 parts of trithiane and 25 parts biphenyl. Then 0.15 part of rhodium trichloride trihydrate was added, the tube was capped and flushed with nitrogen by means of two hypodermic needles which were inserted through the cap. The temperature in the tube was maintained between 180 and 190° C. for 18 hours.

The methylene sulfide polymer was recovered from the unreacted monomer and the solvent by treating the mixture with hot N-methyl-2, pyrrolidone. Both the trithiane and biphenyl dissolved away leaving the solid polymer. This polymer was then washed with benzene and dried at 50° C., leaving a tan-colored powder with a melting point of 245° C.

EXAMPLE XVII

All the procedures of the previous example were repeated, except that 0.01 part of ruthenium trichloride trihydrate were used in place of the rhodium trichloride trihydrate.

After recovery 41 parts of the methylene sulfide polymer remained. This polymer had a melting point of 245° C.

EXAMPLE XVIII

All the procedures of Example XVI were repeated, except that iridium trichloride trihydrate was used in place of the rhodium trichloride trihydrate.

After polymerization, the solid methylene sulfide polymer was collected, washed and then dried.

While the last few examples describe the preparation of methylene sulfide polymers from trithiane, it is also within the scope of our invention to make such methylene sulfide polymers containing substituted thiomethylene groups, from substituted trithianes, e.g., having aryl or alkyl substituents, preferably those substituents which do not enter into any substantial undesirable side reactions.

After polymerization it is generally desirable to incorporate stabilizers into the oxymethylene polymer in order to increase its thermal stability. For example, the thermal stability of oxymethylene polymers and copolymers is enhanced by admixing therewith at least one amidine compound, i.e. a compound having a carbon atom doubly bonded to one nitrogen atom and singly bonded to another. Preferred amidine compounds are the N-substituted amidine compounds wherein another nitrogen atom is singly bonded to the amidino group, most preferably at the carbon atom. Another preferred class of amidine compounds is that in which the carbon atom of the amidino group is bonded to another carbon atom, an oxygen atom or a hydrogen atom. A detailed description of suitable amidine compounds may be found in U.S. Patent No. 3,313,767, issued on Apr. 11, 1967 to Frank M. Berardinelli, Raymond J. Kray, and Thomas J. Dolce.

The polymer composition may also contain a phenolic material, preferably an alkylene bisphenol, as a thermal stabilizer. It appears that the stabilization action of the amidine compounds and of the phenols enhance each other so that a mixture of a stabilizer of each class is more effective than a comparable amount of stabilizer of either class, by itself.

A suitable class of alkylene bisphenols includes compounds having from 1 to 4 carbon atoms in the alkylene group and having up to 2 alkyl substituents on each benzene ring, each alkyl substituent having from 1 to 4 carbon atoms. The preferred alkylene bisphenols are:

2,2′-methylene bis-(4-methyl-6-tertiary butyl phenol);
2,2′-ethylene bis-(4-methyl-6-tertiary butyl phenol);
4,4′-ethylidene bis(6-tertiary butyl-3-methyl phenol) and
4,4′-butylidene bis-(6-tertiary butyl-3-methyl phenol).

Suitable phenolic stabilizers other than alkylene bisphenols include 2,6-ditertiary butyl-4-methyl phenol, octyl phenol and p-phenyl phenol.

Particularly effective are the mixtures in all proportions of at least two amidine compounds and a phenolic stabilizer, such as the mixture of a cyanoguanidine, an amine-substituted triazine, and alkylene bisphenol. The most preferred of such stabilizer combinations employ a melamine compound as the amine substituted triazine.

While the amidine-phenolic compound stabilizer system imparts the desired thermal stability, with certain systems the stabilized polymer may exhibit slight undesirable exudation upon maintenance for extended periods of time at elevated temperatures. Similarly, certain other such systems may result in the stabilized polymer exhibiting undesirable color characteristics.

Melamine compound-cyanoguanidine compound admixtures have been found to optimize thermal and structural stability and color properties of the stabilized polymer, and in some instances represent an improved stabilizer system over the use of either amidine compound alone. Most preferably, the stabilizer system comprises a melamine compound, a cyanoguanidine compound, and a phenolic material such as an alkylene bisphenol.

The amidine compounds are generally admixed with the oxymethyleen polymer in amounts not exceeding 5%, based upon the wegiht of the oxymethylene polymer, preferably in amounts between about 0.01 and 1 weight percent. The alkylene bisphenol, when used, is admixed in amounts not exceeding 5 weight percent and preferably from about 1 to about 0.01 weight percent, most preferably from 1 to 0.3 weight percent, based upon the weight of the oxymethylene polymer.

The amidine compounds, and the alkylene bisphenols, if desired, may be admixed intimately with the oxymethylene polymer by being applied in solution in a suitable solvent to the finely divided solid oxymethylene polymer followed by evaporation of the solvent.

The admixture may also be made by dry blending the finely divided oxymethylene polymer and finely divided stabilizers and by milling the stabilizers into the polymer as the latter is worked on a rubber mill.

The oxymethylene polymer produced by the transition metal catalysts of the instant invention may also include if desired, plasticizers, pigments and other stabilizers, e.g. stabilizers against degradation by ultraviolet light, e.g. 2,2′-dihydroxy-4,4′-dimethoxy benzophenone; 2-hydroxy-4-methoxy benzophenone; 2-hydroxy-4-methoxy-4′-chlorobenzophenone, and the like, which can be incorporated in amounts of about 1% by weight, based upon the weight of the oxymethylene polymer.

It is to be understood that the foregoing detailed description is given merely by way of illustration and that many other variations may be made therein without departing from the spirit of our invention as defined in the following claims.

The embodiments of the invention in which an exclusive property or privilege is claimed are defined as follows:

1. A process for producing polymers selected from the group consisting of methylene sulfide polymers and oxymethylene polymers, said oxymethylene polymers comprising homopolymers and copolymers containing from about 60 to 99.6 mol percent of recurring oxymethylene (—OCH$_2$—) units interspersed with (—OR—) groups in the main polymer chain wherein R is a divalent radical containing at least two carbon atoms directly linked to each other and positioned in the chain between the two valences, with any substituents on said R radical being inert, said process comprising polymerizing at least one monomer selected from the group consisting of substituted and unsubstituted trithiane wherein said substituents are aryl or alkyl, trioxane, formaldehyde, 1,3-dioxolane, and substituted and unsubstituted dioxanes wherein said substituent is lower alkyl, in the presence of a catalytic amount of a catalyst selected from the group consisting of the hydrates of metal halides represented by the general formula:

$$M(Z)_n$$

wherein M represents a metal selected from the group consisting of ruthenium, rhodium, palladium, osmium, iridium and platinum, Z is a halogen, and $n$ is a whole number of from 2 to 4, inclusive, which corresponds to the valence of M.

2. The process of claim 1 wherein Z represents chlorine.
3. The process of claim 1 wherein M represents iridium.
4. The process of claim 1 wherein said catalyst is iridium trichloride trihydrate.
5. The process of claim 1 wherein said catalyst is ruthenium trichloride trihydrate.
6. The process of claim 1 wherein said catalyst is rhodium trichloride trihydrate.
7. The process of claim 1 wherein said monomer is trioxane.
8. The process of claim 1 wherein said monomer is selected from the group consisting of trioxane and mixtures of trioxane with at least one monomer selected from the group consisting of 1,3 dioxolane and substituted and unsubstituted dioxanes wherein said substituent is lower alkyl, and wherein said trioxane constitutes at least 40 mole percent of the mixture, in the presence of a catalytic amount of a catalyst selected from the group consisting of the hydrates of metal halides represented by the general formula:

$$M(Z)_n$$

wherein M represents a metal selected from the group consisting of ruthenium, rhodium, palladium, osmium, iridium and platinum, Z is a halogen, and $n$ is a whole number of from 2 to 4, inclusive, which corresponds to the valence of M.

9. The process of claim 1 wherein said monomers are trioxane and 1,3-dioxolane.
10. The process of claim 1 wherein said monomers are trioxane and 1,3-dioxane.
11. The process of claim 1 wherein said monomer is trithiane.
12. The process of claim 1 wherein said hydrate is formed in the polymerization zone by incorporating into said zone, together with a metal halide represented by the general formula:

$$M(Z)_n$$

wherein M represents a metal selected from the group consisting of ruthenium, rhodium, palladium, osmium, iridium, and platinum, Z is a halogen, and $n$ is a whole number of from 2 to 4, inclusive, which corresponds to the valence of M, an amount of water sufficient to substantially completely form the hydrate of said metal halide.

13. The process of claim 12 wherein Z represents chlorine.
14. The process of claim 12 wherein said metal halide is iridium trichloride.

References Cited

UNITED STATES PATENTS

| | | | |
|---|---|---|---|
| 3,200,096 | 8/1965 | Hudgin et al. | 260—67 |
| 3,218,300 | 11/1965 | Kullmar et al. | 260—79 |
| 3,367,916 | 2/1968 | Von Der Emden et al. | 260—67 |

WILLIAM H. SHORT, Primary Examiner

L. M. PHYNES, Assistant Examiner

U.S. Cl. X.R.
260—45.9, 45.95, 79